United States Patent
Rademacher et al.

(10) Patent No.: US 9,056,606 B1
(45) Date of Patent: Jun. 16, 2015

(54) SYSTEM AND METHOD FOR CONTROLLING A STOP/START SYSTEM FOR A VEHICLE ENGINE

(71) Applicant: FORD GLOBAL TECHNOLOGIES, LLC, Dearborn, MI (US)

(72) Inventors: Eric Michael Rademacher, Royal Oak, MI (US); Chad Everette Griffin, Pinckney, MI (US); Kirk Pebley, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 14/097,782

(22) Filed: Dec. 5, 2013

(51) Int. Cl.
| | |
|---|---|
| *B60W 10/04* | (2006.01) |
| *B60W 10/10* | (2012.01) |
| *B60W 10/06* | (2006.01) |
| *B60W 10/184* | (2012.01) |
| *B60W 10/11* | (2012.01) |
| *F02N 99/00* | (2010.01) |

(52) U.S. Cl.
CPC ............. *B60W 10/06* (2013.01); *B60W 10/184* (2013.01); *B60W 10/11* (2013.01); *F02N 99/00* (2013.01)

(58) Field of Classification Search
CPC .............. Y10T 477/24; Y10T 477/322; Y10T 477/182; Y10T 477/343; Y10T 477/621; Y10T 477/6394; Y10T 477/111; Y10T 477/68; F02N 11/0822; F02N 11/0818; F02N 11/0825; F02N 11/0844; F02N 2250/06; B60W 30/18009
USPC .......................... 477/92, 94, 99, 107, 199, 203
See application file for complete search history.

(56) References Cited

U.S. PATENT DOCUMENTS

| | | | |
|---|---|---|---|
| 5,653,659 A * | 8/1997 | Kunibe et al. ................. | 477/111 |
| 6,007,451 A | 12/1999 | Matsui et al. | |
| 6,190,284 B1 | 2/2001 | Kuroda et al. | |
| 6,504,259 B1 * | 1/2003 | Kuroda et al. ............. | 290/40 C |
| 6,913,558 B2 | 7/2005 | Mori et al. | |
| 7,484,816 B2 * | 2/2009 | Maruyama et al. ........... | 303/191 |
| 8,290,681 B2 | 10/2012 | Kaminsky et al. | |
| 8,690,731 B1 * | 4/2014 | Sangameswaran et al. .. | 477/111 |
| 8,702,563 B1 * | 4/2014 | Sangameswaran et al. .. | 477/111 |
| 2003/0087724 A1 | 5/2003 | Seibertz et al. | |

(Continued)

FOREIGN PATENT DOCUMENTS

| | | |
|---|---|---|
| CN | 101722953 A | 6/2010 |
| CN | 102667110 A | 9/2012 |

(Continued)

OTHER PUBLICATIONS

First Office Action, Chinese Patent Application No. 201310637131. 6, Oct. 24, 2014.

(Continued)

*Primary Examiner* — Roger Pang
*Assistant Examiner* — Tinh Dang
(74) *Attorney, Agent, or Firm* — David B. Kelley; Brooks Kushman P.C.

(57) ABSTRACT

A system and method for controlling a stop/start system for an engine in a vehicle include auto starting the engine in response to a transmission gear lever being shifted out of DRIVE when the engine has been auto stopped while the gear lever is in DRIVE. The auto starting is further in response to the gear lever being shifted into another gear and a vehicle brake being released within a predetermined time interval after the gear lever is moved into the other gear.

13 Claims, 3 Drawing Sheets

(56) References Cited

U.S. PATENT DOCUMENTS

2011/0270512 A1* 11/2011 Hayashi et al. .............. 701/112
2012/0010792 A1 1/2012 Nedorezov et al.
2013/0124026 A1 5/2013 Ueno et al.

FOREIGN PATENT DOCUMENTS

| EP | 1052399 | A2 | 11/2000 |
|---|---|---|---|
| EP | 2138712 | A1 | 12/2009 |
| WO | 2006027515 | A1 | 3/2006 |

OTHER PUBLICATIONS

First Office Action, Chinese Patent Application No. 201310629692.1, Nov. 4, 2014.

* cited by examiner

SYSTEM AND METHOD FOR CONTROLLING A STOP/START SYSTEM FOR A VEHICLE ENGINE

TECHNICAL FIELD

The present invention relates to a system and method for controlling a stop/start system for an engine in a vehicle.

BACKGROUND

In vehicles equipped with a stop/start system, for example, micro hybrid vehicles, the engine is automatically stopped and restarted by a control system under certain conditions—e.g., when the vehicle is stopped. One type of start-stop system for a vehicle with an automatic transmission is a "Stop-in-Drive" system (SID). In such a system, the engine will only be autostopped when the transmission gear lever is in the "DRIVE" position. The engine is restarted when the gear lever is moved out of DRIVE.

SUMMARY

A system and method for controlling a stop/start system for an engine in a vehicle include auto starting the engine in response to a transmission gear lever being shifted out of DRIVE and into another gear and a vehicle brake being released within a predetermined time interval after the gear lever is moved into the other gear, when the engine has been auto stopped while the gear lever is in DRIVE.

In one embodiment, the other gear is NEUTRAL. In such an embodiment, the predetermined time interval is a first predetermined time interval after the gear lever is shifted into NEUTRAL. In some such embodiments, the method further includes alerting a driver to press the vehicle brake in response to the gear lever being shifted into NEUTRAL, the vehicle brake being released after the first predetermined time interval, and the gear lever being subsequently shifted into REVERSE. Such an embodiment further includes auto starting the engine in response to the vehicle brake being pressed after alerting the driver.

In another embodiment, the other gear is REVERSE. In such an embodiment, the predetermined time interval is a second predetermined time interval after the gear lever is shifted into REVERSE. In some such embodiments, the method further includes auto starting the engine in response to the gear lever being shifted into REVERSE and left in REVERSE for at least the second predetermined time interval.

A vehicle having a stop/start system controlling an engine comprises a brake pedal, a transmission gear lever, and a controller. The controller is configured to auto start the engine in response to the transmission gear lever being shifted out of DRIVE into another gear and the brake pedal being released within a predetermined time interval after the gear lever is shifted into the other gear, when the engine has been auto stopped with the vehicle in DRIVE.

In one embodiment, the other gear is NEUTRAL. In such an embodiment, the predetermined time interval is a first predetermined time interval after the gear lever is shifted into NEUTRAL. In some such embodiments, the controller is further configured to signal an alert instructing a driver to press the vehicle brake to start the engine. The signaling is in response to the gear lever being shifted into NEUTRAL, the vehicle brake being released after the first predetermined time interval, and the gear lever being subsequently shifted into REVERSE. In such an embodiment, the controller may be further configured to auto start the engine in response to the vehicle brake being pressed while the alert is signaled.

In one embodiment, the other gear is REVERSE. In such an embodiment, the predetermined time interval is a second predetermined time interval after the gear lever is shifted into REVERSE. In such an embodiment, the controller may be further configured to auto start the engine in response to the gear lever being shifted into REVERSE and left in REVERSE for at least the second predetermined time interval.

A hybrid vehicle includes an engine configured to auto stop and auto start, a brake pedal, a gear lever controlling a transmission, and a controller. The controller is configured to auto start the engine in response to the gear lever being shifted from DRIVE into NEUTRAL and the brake being released within a first calibratable time interval after the gear lever is shifted into NEUTRAL. The controller is also configured to auto start the engine in response to the gear lever being shifted from DRIVE into REVERSE and the brake being released within a second calibratable time interval after the gear lever is shifted into REVERSE. The controller is further configured to auto start the engine in response to the gear lever being shifted from DRIVE into REVERSE and being left in reverse for the second calibratable time interval after the gear lever is shifted into reverse. In one embodiment, the controller is additionally configured to signal a driver to press the brake pedal to start the engine, where the signaling is performed in response to the gear lever being shifted from DRIVE into NEUTRAL, the brake being released after the first calibratable time interval has expired, and the gear lever being subsequently shifted into reverse. The controller is further configured to auto start the engine when the driver presses the brake pedal.

Embodiments according to the present disclosure provide a number of advantages. For example, methods according the present disclosure enable a stop/start vehicle to remain auto stopped in NEUTRAL, preventing unnecessary vehicle starts. In addition, methods according to the present disclosure include a rapid vehicle restart when the gear lever is moved to reverse, enabling a driver to quickly begin motion.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Stop/start vehicles are powered by conventional internal combustion engines and equipped with stop/start systems controlling auto-stop and auto-start functions. The stop/start system may auto-stop the engine when the vehicle is stopped and the engine is not required for propulsion or other purposes. At a later time, the stop/start system may auto-start the engine when required for propulsion or other purposes. By disabling the engine when possible, overall fuel consumption is reduced. Unlike true hybrid vehicles, stop/start vehicles are not capable of pure electric propulsion. Furthermore unlike true hybrid vehicles, stop/start vehicles are not equipped with a traction battery. Rather they merely include a conventional starting, lighting, and ignition (SLI) battery.

Controllers may initiate an auto-stop or auto-start of the engine. As the vehicle comes to a stop, for example, the controllers may issue a command to begin the process to stop the engine, thus preventing the alternator or integrated starter generator from providing electric current to the electrical loads. The battery may provide electric current to the electrical loads while the engine is stopped. As the brake pedal is disengaged (and/or the accelerator pedal is engaged) after an engine auto-stop, the controllers may issue a command to begin the process to start the engine, thus enabling the alternator or integrated starter generator to provide electric current to the electrical loads.

Figure 1:
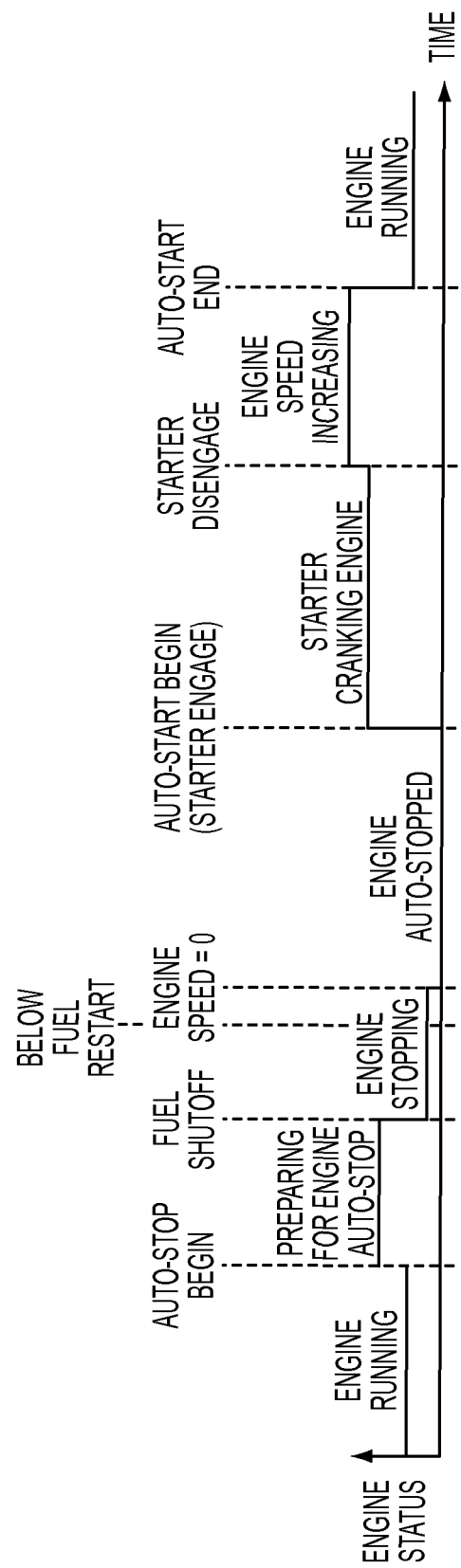
FIG. 1 is a plot illustrating engine status during an auto stop.

With reference to FIG. 1, an engine stop/start sequence may include several stages: "auto-stop begin," which marks the beginning of the engine auto-stop; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed is reduced to 0; "below fuel restart," which marks the point after which if a restart is requested to inhibit the auto stop during the "engine stopping" stage, the starter may need to be engaged to crank the engine (if a restart is requested before "below fuel restart" and during the "engine stopping" stage, the engine may be restarted to inhibit the auto stop by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine auto-start condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed; and, "auto-start end," which marks the point at which the speed of the engine achieves its running speed (a speed at or above target idle speed).

In a stop in drive system there are situations where the driver arrives at the end of their journey, brings the vehicle to a stop, and assuming all other autostop criteria are met, the engine autostops while still in DRIVE. If the driver moves the gear lever out of DRIVE, the engine automatically restarts. This may not be desirable, however, as the driver's intention may be to move the gear lever to "PARK" and "key-off" the vehicle. Although it may be desirable to maintain an autostopped condition when the gear lever is moved from DRIVE to PARK, it may not be when the gear lever is moved out of DRIVE to "REVERSE".

Therefore, a need exists for a system and method to control an engine in a vehicle such that after being autostopped while the vehicle is in DRIVE, and the transmission gear lever is shifted out of DRIVE, the vehicle engine will be automatically restarted under certain conditions, but not others.

Figure 2:
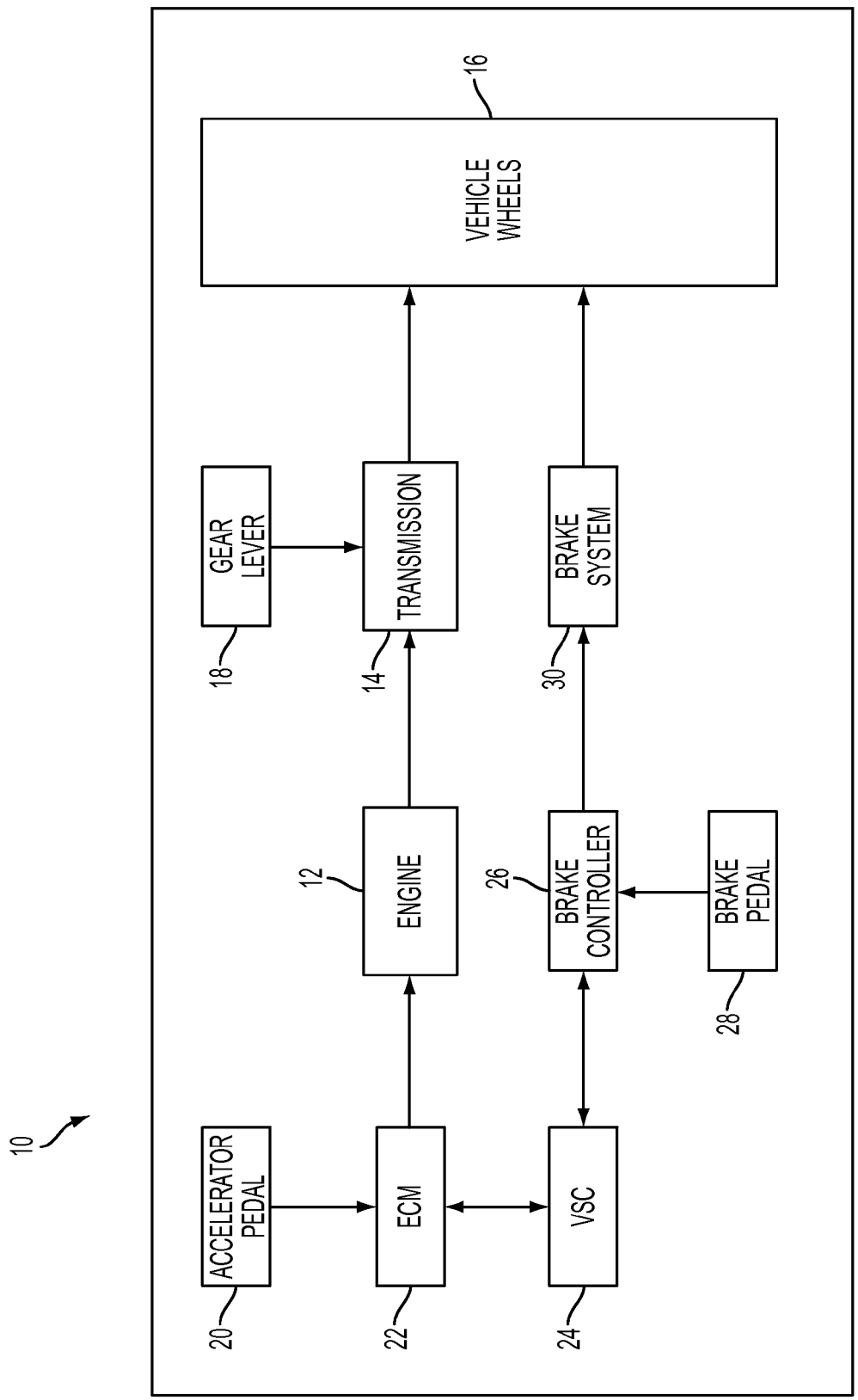
FIG. 2 is a block diagram of a stop/start vehicle.
Figure 3:
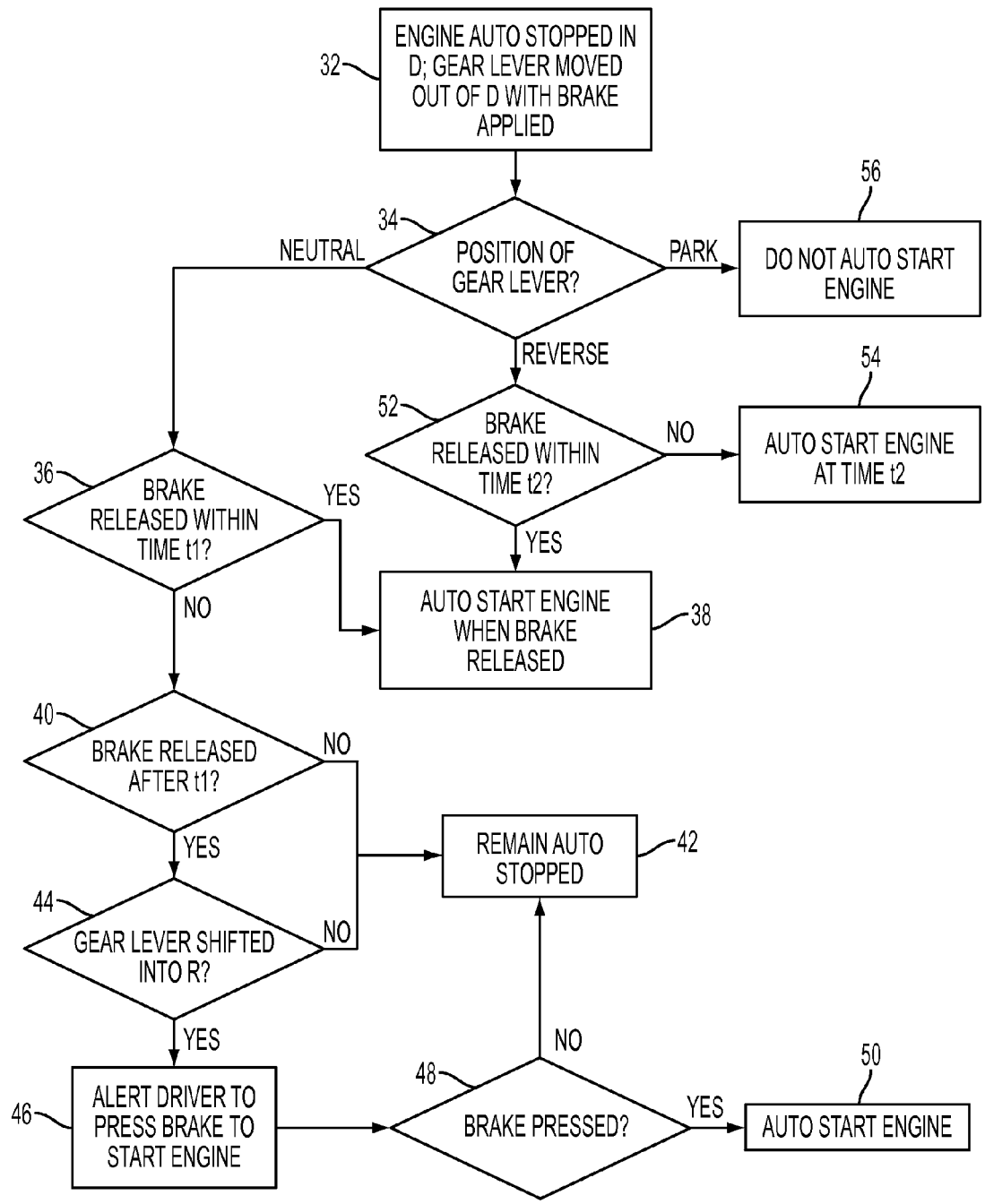
FIG. 3 is a flowchart illustrating an algorithm for controlling a stop/start vehicle.

Referring now to FIG. 2, a vehicle 10 includes an engine 12 having an output connected to transmission 14. Transmission 14 transfers power to vehicle wheels 16. A gear lever 18 provides driver input to transmission 14. An accelerator pedal 20 provides driver input to an engine control module (ECM) 22. ECM 22 provides control signals to engine 12. ECM 22 is in communication with a vehicle system controller (VSC) 24. VSC 24 is additionally in communication with a brake controller 26. A brake pedal 28 provides driver input to brake controller 26. Brake controller 26 controls a frication brake system 30, which is configured to apply a braking force to vehicle wheels 16.

As noted above, embodiments of the present invention include a control system for controlling a start-stop system for an engine in a vehicle, such as the engine 12 and the vehicle 10. Such a control system may be embodied by one or more controllers, such as the ECM 22 or the VSC 24, but more generally may include any number of hardware and/or software controllers residing in different parts of the vehicle and communicating with one another, for example, through a controller area network (CAN).

In some start-stop systems, the engine may be automatically stopped when all of a certain set of conditions are met. For example, if the gear lever is in DRIVE, the brake pedal is pressed, the accelerator pedal is released, and the vehicle speed is close to zero, the engine may be automatically stopped. Another condition that may be included in this set of conditions is that no vehicle subsystem requires the engine to be running—e.g., high power-consuming subsystems such as air conditioning or power steering. In a start-stop system where all conditions are required to be met before the engine is autostopped, not only will the start-stop system keep the engine from being automatically stopped if any of the conditions in the set are not met, but once having been autostopped, the engine may be automatically restarted if any of the conditions change.

Continuing then with the example from above, if the engine has been autostopped while the vehicle is in DRIVE and the brake pedal is pressed, the engine will be automatically restarted if the driver shifts out of DRIVE. As discussed above, this may be undesirable, particularly if the driver intends to place a vehicle in PARK, and shut the engine off. As an additional consideration, it is desirable to auto start the engine quickly if the driver intends to place the vehicle in REVERSE. Furthermore, federal motor vehicle safety regulations require that if a vehicle engine is auto stopped in DRIVE and the gear lever is moved to REVERSE, the engine may not be started unless a vehicle brake is applied. Therefore, in at least some embodiments of the present invention, a controller, which may be for example the engine controller 22, is configured to account for these different requirements.

Referring to FIG. 2, a flowchart illustrates an embodiment of a method for controlling a stop/start system according to the present disclosure. The method may be implemented, for example, by a controller or controllers such as controllers 22, 24, and 26 described above. The method begins at block 32, where the engine has been auto stopped while the vehicle is in DRIVE and the brake is applied, and the gear lever is shifted out of DRIVE while the brake is still applied. This will generally occur when the vehicle speed is close to zero and the driver intends to put the transmission in NEUTRAL, REVERSE, or PARK. A controller monitors the position of the gear lever as it changes gears. At operation 34, a determination is made of whether the gear lever is in NEUTRAL, REVERSE, or PARK.

If a determination is made at operation 34 that the gear lever is in NEUTRAL, then control proceeds to operation 36. At operation 36, control monitors whether the vehicle brake is released within a threshold time t1, where t1 is measured from the gear lever being moved into NEUTRAL. Threshold t1 may be set to a relatively short time interval, such that a driver intent to continue moving the gear lever into REVERSE may be inferred from the quick brake release in NEUTRAL. As an example, time threshold t1 may be approximately 300 ms. If the vehicle brake is released within threshold time t1, then the engine is auto started when the brake is released, as illustrated at block 38. If the vehicle brake is not released within time t1, then control proceeds to operation 40. At operation 40, control monitors whether the brake is released after time t1 elapses. If no, then the engine remains auto stopped, as illustrated at block 42. Although the engine will remain auto stopped so long as the monitoring of operation 40 continues, other engine restart requests external to this method may cause the engine to auto start. For example, if the battery state of charge drops below an associated state of charge threshold, a battery system controller may request an engine auto start. Returning to operation 40, if the brake is released after time threshold t1 elapses, then control proceeds to operation 44. At operation 44, control monitors whether the gear lever is shifted into REVERSE. If no, then the engine remains auto stopped as illustrated at block 42. If yes, then an alert is displayed to a driver to press the brake in order to restart the engine, as illustrated at block 46. Control then proceeds to operation 48. At operation 48, control monitors whether the brake is pressed within a predetermined monitoring period. If no, then the engine remains auto stopped as illustrated at block 42 and described above. If yes, then the engine is auto started when the brake is pressed, as illustrated at block 50.

Returning to operation 34, if a determination is made that the gear lever is in REVERSE, then control proceeds to operation 52. At operation 54, control monitors whether the vehicle brake is released within a threshold time t2, where t2 is measured from the gear lever being moved into REVERSE. Time t2 may be set to a time interval sufficiently long to infer that REVERSE is the intended final position for the gear lever and not a transient position as the driver moves the gear lever to a different gear. As an example, time threshold t2 may be approximately 200 ms. If the vehicle brake is released within threshold time t2, then the engine is auto started when the brake is released, as illustrated at block 38. If no, then the engine is auto started at time t2. The engine will thus be auto started when a driver intent to put the transmission in REVERSE may be inferred either from a brake release when the gear lever is in REVERSE or from a sufficient elapsed time when the gear lever is in REVERSE.

Returning to operation 34, if a determination is made that the gear lever is in PARK, then the engine is not auto started, as illustrated at block 56.

As can be seen from the various embodiments, the present invention provides a system and method for controlling a stop/start vehicle that quickly auto starts the engine in REVERSE after the engine has been auto stopped, providing rapid vehicle response. The system and method also enable the engine to be auto stopped in NEUTRAL, preventing unnecessary engine restarts.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a stop/start system for an engine in a vehicle, comprising:
    auto starting the engine in response to a transmission gear lever being shifted out of DRIVE and into another gear and a vehicle brake being released within a predetermined time interval after the gear lever is shifted into the another gear when the engine has been auto stopped with the gear lever in DRIVE.

2. The method of claim 1, wherein the another gear is NEUTRAL, and the predetermined time interval is a first predetermined time interval after the gear lever is shifted into NEUTRAL.

3. The method of claim 2, further comprising:
    alerting a driver to press the vehicle brake in response to the gear lever being shifted into NEUTRAL, the vehicle brake being released after the first predetermined time interval, and the gear lever being subsequently shifted into REVERSE; and
    auto starting the engine in response to the vehicle brake being pressed after alerting the driver.

4. The method of claim 1, wherein the another gear is REVERSE, and the predetermined time interval is a second predetermined time interval after the gear lever is shifted into REVERSE.

5. The method of claim 4, further comprising auto starting the engine in response to the gear lever being shifted into REVERSE and left in REVERSE for at least the second predetermined time interval.

6. A vehicle having a stop/start system controlling an engine, comprising:
    a brake pedal;
    a transmission gear lever; and
    a controller configured to auto start the engine in response to the transmission gear lever being shifted out of DRIVE and into another gear and the brake pedal being released within a predetermined time interval after the gear lever is shifted into the another gear when the engine has been auto stopped with the vehicle in DRIVE.

7. The vehicle of claim 6, wherein the another gear is NEUTRAL, and the predetermined time interval is a first predetermined time interval after the gear lever is shifted into NEUTRAL.

8. The vehicle of claim 7, wherein the controller is further configured to signal an alert instructing a driver to press the brake pedal to start the engine, the signaling being in response to the gear lever being shifted into NEUTRAL, the brake pedal being released after the first predetermined time interval, and the gear lever being subsequently shifted into REVERSE.

9. The vehicle of claim 8, wherein the controller is further configured to auto start the engine in response to the brake pedal being pressed while the alert is signaled.

10. The vehicle of claim 6, wherein the another gear is REVERSE, and the predetermined time interval is a second predetermined time interval after the gear lever is shifted into REVERSE.

11. The vehicle of claim 10, wherein the controller is further configured to auto start the engine in response to the gear lever being shifted into REVERSE and left in REVERSE for at least the second predetermined time interval.

12. A hybrid vehicle comprising:
    an engine configured to auto stop and auto start;
    a brake pedal;
    a gear lever controlling a transmission; and a controller configured to auto start the engine in response to the gear lever being shifted from DRIVE into NEUTRAL and the brake being released within a first calibratable time interval after the gear lever is shifted into NEUTRAL, to auto start the engine in response to the gear lever being shifted from DRIVE into REVERSE and the brake being released within a second calibratable time interval after the gear lever is shifted into REVERSE, and to auto start the engine in response to the gear lever being shifted from DRIVE into REVERSE and being left in reverse for the second calibratable time interval after the gear lever is shifted into reverse.

13. The hybrid vehicle of claim 12, wherein the controller is further configured to:
   signal a driver to press the brake pedal to start the engine, the signaling being in response to the gear lever being shifted from DRIVE into NEUTRAL, the brake being released after the first calibratable time interval expires, and the gear lever being subsequently shifted into REVERSE; and
   auto start the engine in response to the brake being depressed after signaling the driver.

* * * * *